(12) United States Patent
Nam

(10) Patent No.: US 7,480,484 B2
(45) Date of Patent: Jan. 20, 2009

(54) MULTI-VIDEO INTERFACE FOR A MOBILE DEVICE

(75) Inventor: Nicholas Nam, Pleasanton, CA (US)

(73) Assignee: OmniVision Technologies, Inc, Santa Clara, CA (US)

( * ) Notice: Subject to any disclaimer, the term of this patent is extended or adjusted under 35 U.S.C. 154(b) by 522 days.

(21) Appl. No.: 10/816,584

(22) Filed: Mar. 30, 2004

(65) Prior Publication Data

US 2005/0239401 A1   Oct. 27, 2005

(51) Int. Cl.
*H04H 7/00*   (2006.01)

(52) U.S. Cl. .................. 455/3.06; 455/414.4; 455/41.2; 455/41.3

(58) Field of Classification Search ............... 455/426, 455/3.06, 414, 566, 556.1, 550.1, 556, 466, 455/41.2, 41.3, 420, 414.4, 412.1, 552.1; 345/730, 204; 463/40; 348/14.02, 207
See application file for complete search history.

(56) References Cited

U.S. PATENT DOCUMENTS

| | | | |
|---|---|---|---|
| 5,880,732 A * | 3/1999 | Tryding ..................... 715/810 |
| 5,917,475 A | 6/1999 | Kuzunuki |
| 5,959,640 A | 9/1999 | Rudin |
| 5,977,933 A | 11/1999 | Wicher |
| 6,287,200 B1 * | 9/2001 | Sharma ..................... 463/40 |
| 6,466,204 B1 | 10/2002 | Oh |
| 6,795,715 B1 * | 9/2004 | Kubo et al. ............... 455/556.1 |
| 6,871,243 B2 * | 3/2005 | Iwase et al. ................ 710/62 |
| 7,202,885 B2 * | 4/2007 | Motohashi ............... 348/14.02 |
| 7,239,323 B2 * | 7/2007 | Park ........................ 345/531 |
| 2002/0055369 A1 * | 5/2002 | Nakamura et al. ........... 455/556 |
| 2002/0056131 A1 * | 5/2002 | Hayashi et al. ............. 725/115 |
| 2002/0068558 A1 | 6/2002 | Janik |
| 2002/0082043 A1 * | 6/2002 | Wilska et al. ............... 455/550 |
| 2002/0089589 A1 * | 7/2002 | Adair et al. ................. 348/158 |
| 2002/0094845 A1 * | 7/2002 | Inasaka ..................... 455/566 |
| 2002/0102998 A1 * | 8/2002 | Lin .......................... 455/466 |
| 2002/0154221 A1 * | 10/2002 | Ishimaru .................. 348/207.1 |
| 2003/0050059 A1 * | 3/2003 | Tsukamoto ................. 455/426 |
| 2003/0110512 A1 | 6/2003 | Maari |
| 2003/0112279 A1 * | 6/2003 | Irimajiri ..................... 345/810 |
| 2003/0128197 A1 * | 7/2003 | Turner et al. ................ 345/204 |
| 2003/0134590 A1 * | 7/2003 | Suda et al. ................. 455/3.06 |
| 2003/0135748 A1 * | 7/2003 | Yamada et al. ............. 713/193 |
| 2003/0210461 A1 * | 11/2003 | Ashizaki et al. ............. 359/443 |
| 2004/0046783 A1 * | 3/2004 | Montebovi .................. 345/730 |
| 2004/0090541 A1 * | 5/2004 | Manowitz et al. ......... 348/231.99 |
| 2004/0166895 A1 * | 8/2004 | Koenck et al. ............. 455/556.1 |
| 2004/0198437 A1 * | 10/2004 | Yamamoto et al. ......... 455/556.1 |
| 2005/0251694 A1 * | 11/2005 | Ueda et al. ................. 713/193 |
| 2006/0194619 A1 * | 8/2006 | Wilcox et al. ............... 455/566 |
| 2007/0196078 A1 * | 8/2007 | Kunii et al. ................. 386/83 |

OTHER PUBLICATIONS

European Search Report App. No. EP 05 25 1036; OmniVision Technologies, Inc.; dated Aug. 19, 2005; 3 pages.

(Continued)

*Primary Examiner*—Tan Trinh
(74) *Attorney, Agent, or Firm*—Cooley Godward Kronish LLP

(57) ABSTRACT

A mobile device including a multi-video interface is disclosed herein. The multi-video interface is configured to permit information present at the mobile device to be viewed at an external display. The external display is not required to specially process the output signals from the mobile device or otherwise implement an adapter.

22 Claims, 1 Drawing Sheet

OTHER PUBLICATIONS

Sekiguchi et al., "A Display centric ubiquitous information system—'Dokodemo-Display,'" IEEE Proceedings of the 2004 International Symposium on Applications and the Internet Workshops (SAINTW'04), 7 pages.

* cited by examiner

MULTI-VIDEO INTERFACE FOR A MOBILE DEVICE

BACKGROUND

The present invention relates to mobile devices. More particularly, the present invention relates to a multi-video interface for mobile devices.

Many mobile devices, such as cellular telephones, personal digital assistants (PDAs), and handheld video games, include an attached or embedded display to present visual information and/or a memory unit to store data or images. Typically, because the mobile devices are of compact size, the display and memory unit are also constrained in size.

Still images or moving images (e.g., video) can be viewed or stored at a display or memory unit, respectively, of a mobile device. Unfortunately, due to the large data size of quality digital images/video, even compressed digital images/video, the amount of images/video that can be stored at the mobile device is limited. Presently to store or record any significant amount of images/video, an additional (e.g., external) memory or storage unit is required, such as a videotape.

Also, a user may wish to view information provided by the mobile device at a display other than the display native to the mobile device. The alternate display may be desirable because this display has a larger viewing size, is of a higher resolution or quality (e.g., color display rather than a monochrome display), or perhaps to view the information simultaneously on more than one display. Unfortunately, present mobile devices are not capable of, among others, providing multiple display outputs.

Thus, there is a need for a mobile device capable of multiple display inputs/outputs. There is a further need for the multiple display inputs/outputs of the mobile device to be able to facilitate presentation and storage of images or video.

BRIEF DESCRIPTION OF THE DRAWINGS

The exemplary embodiments will become more fully understood from the following detailed description, taken in conjunction with the accompanying drawings, wherein like reference numerals denote like elements, in which.

Figure 1:
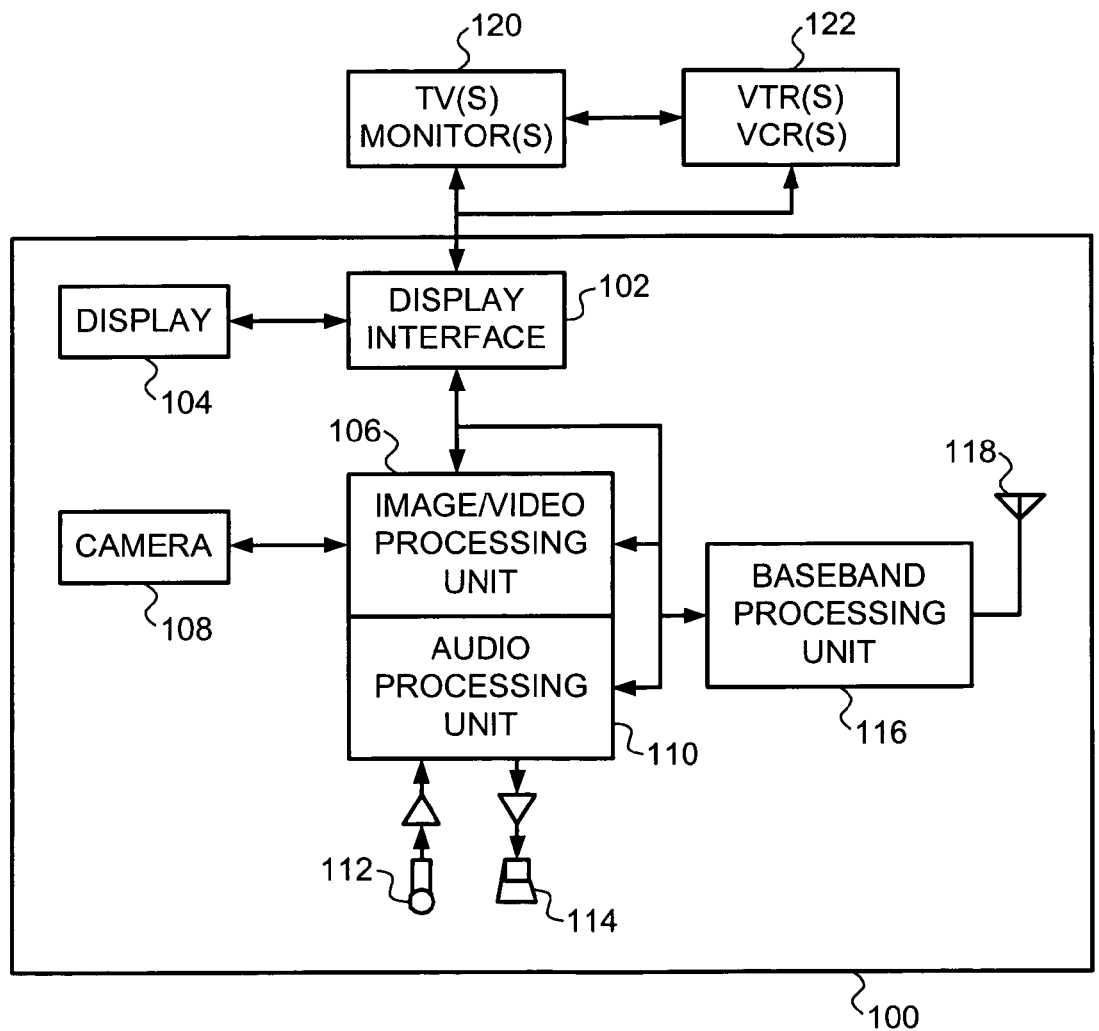
FIG. 1 is a block diagram of one embodiment of a mobile device.

Sizes of components are not drawn to scale, and various components may be enlarged or reduced to improve drawing legibility. Component details have been abstracted in the Figures to exclude details such as position of components and certain precise connections between such components when such details are unnecessary to the invention.

DETAILED DESCRIPTION

In one embodiment, images/video from a mobile device can be displayed and/or stored at one or more external displays or storage units. Such images/video can also be displayed and/or stored simultaneously at a display or storage unit embedded in the mobile device. The external display(s) and storage unit(s) can be televisions, video cassette recorders (VCRs), video tape recorders (VTRs), etc.

In FIG. 1, a block diagram of one embodiment of a mobile device 100 is shown.

The mobile device 100 is configured to be a portable device that provides visual information and one or more of a variety of other functions such as image/video capture, wireless communication, etc. The mobile device 100 may be, but is not limited to, a cellular phone, personal digital assistant (PDA), video game console, digital camera, digital camcorder, computing device, or wireless communication device.

The mobile device 100 includes a display interface 102, a display 104, an image/video processing unit 106, a camera 108, an audio processing unit 110, a microphone 112, a speaker 114, a baseband processing unit 116, and a transceiver 118. The display interface 102 is coupled between the display 104 and the image/video processing unit 106. The camera 108 is coupled to the image/video processing unit 106. Each of the microphone 112 and the speaker 114 is coupled to the audio processing unit 110. The transceiver 118 is coupled to the baseband processing unit 116. The processing units 106, 110, and 116 and the display interface 102 are in communication with each other.

The display interface 102 is configured to format and route still and/or moving images (hereinafter referred to as images and videos, respectively) to and from the display 104, the image/video processing unit 106, the baseband processing unit 116, an external display 120, and an external storage unit 122. The display interface 102 configures the images/video for transport, storage, or display. The output signals from the display interface 102 to each of the external display 120 and storage unit 122 can be analog or digital signals. The output signals can also be composite or component signals. Composite signals are communicated in a single signal line, as they contain all signal components except power and ground. Component signals are communicated in more than one signal line, as all signal components cannot be provided in any single signal line. The display interface 102 is discussed in greater detail below.

The display 104 is configured to present visual information provided by the display interface 102. The display 104 is attached, embedded, or otherwise native to the mobile device 100. The display 104 can be a variety of display types suitable for mobile devices, such as a liquid crystal display (LCD) or touch screen. The display 104 may be a monochrome or color display.

The camera 108 is configured to capture images/video of an object of interest. The camera 108 may be, for example, a semiconductor sensor array. Captured images/video are transmitted to the processing units 106 and 110.

The microphone 112 is configured to capture audio signals. The microphone 112 may be embedded in the mobile device 100 or be a detachable unit. The captured audio signals are then transmitted to the processing unit 110. The speaker 114 is configured to broadcast or project audio sounds to the environment. The audio signals corresponding to the audio sounds to be projected are provided by the processing unit 110.

The transceiver 118 is configured to transmit and receive wireless signals to and from another wireless transceiver (not shown). The wireless signals can comprise a variety of data, including data representative of images/video, sound, and/or data. The transceiver 118 and the processing unit 116 condition signals for wireless transmission (e.g., configuring data on a carrier frequency, configuring control channels, etc.) and reassemble received wireless signals. At least one of the transceiver 118 and the processing unit 116 may include a memory, controller, processor, router, switch, bus, etc. to perform the wireless communication functions. In one embodiment, the transceiver 118 may comprise an antenna and the processing unit 116 may provide all other functionalities.

The processing unit 106 is configured to process image/video signals received or transmitted by the mobile device 100. Image/video signals (also referred to as input signals) can be received from each of the display 104 (e.g., as a touch screen), camera 108, transceiver 118, external display 120, and external storage unit 122. Depending on the form of the input signals and their destination, the processing unit 106 performs one or more functions. For example, if input signals are coming from the camera 108 and such input signals are to be stored within the mobile device 100, then the processing unit 106 compresses the input signals (using image compression schemes such as JPEG, M-JPEG, or MPEG) to reduce the data size and routes the compressed input signals to a memory included in the mobile device. In another example, if input signals are coming from the transceiver 118 and such input signals are to be displayed at the display 104, then the processing unit 106 decompresses the input signals, transmits the decompressed input signals to the display interface 102, the decompressed input signals are conditioned into signals compatible with the display 104, and are transmitted to the display 104 for presentation. Accordingly, the processing unit 106 can include one or more image/video encoders and decoders, memory, processor, microcontroller, buffer, and routers.

The processing unit 110 is configured to process audio signals received or transmitted from the mobile device 100. The audio signals can be received from each of the camera 108, microphone 112, transceiver 118, external display 120, and external storage unit 122. The audio signals can be transmitted to each of the display 104, speaker 114, transceiver 118, external display 120, and external storage unit 122. The audio signals may be provided as part of the image/video signals. The processing unit 110 appropriately conditions the audio signals depending on their state and destination. The processing unit 110 can include audio compression/decompression components or algorithms (e.g., MP3 compression), processors, microcontrollers, filters, and/or memory.

The processing units 106 and 110 are in communication or work in conjunction with each other to handle the image/video and/or audio signals received, routed, or transmitted by the mobile device 100. It is contemplated that the processing units 106 and 110 may be embodied as a single component.

The components of the mobile device 100 may be embodied as hardware, firmware, and/or software. For example, the camera 108 may comprise a sensor chip, the processing units 106 and 110 and the display interface 102 may comprise another chip, and the processing unit 116 and the transceiver 118 may comprise yet another chip. Alternatively, the functionalities of two or more chips may be embodied in a single chip such as a system-on-chip (SOC). It should also be understood that one or more components illustrated in FIG. 1 may be omitted depending on the mobile device 100. For instance, if the mobile device 100 has no wireless communication capabilities, the transceiver 118 and the processing unit 116 would not be included. Alternatively, if the mobile device 100 is used primarily for capturing images/video, then more than one memory unit, or a detachable or swappable memory unit(s), may be native to the mobile device.

The external display 120 and the external storage unit 122 are not embedded or native to the mobile device 100. Although each of the external display 120 and the external storage unit 122 can be coupled to the mobile device 100, the coupling is accomplished for purposes of transmitting image/video and/or audio signals. The external display 120 and the external storage unit 122 are typically too large and cumbersome to be portable or to be moved around with the mobile device 100.

The external display 120, e.g., a television, monitor, or other display type, receives and/or transmits image/video signals with the display interface 102. The external display 120 can include an S-video in port and the display interface 102 can include a corresponding S-video out port. Same or different images/video can be simultaneously viewed at the display 104 and the external display 120. The external display 120 may be one or more displays. The external display 120 can be a large screen TV, a plasma display, an LCD, a rear projection display, a cathode ray tube (CRT) display, or a variety of other display types or sizes compatible with conventional video format, such as NTSC, PAL, or digital video formats.

Moreover, the external storage unit 122, e.g., a video tape recorder (VTR), a video cassette recorder (VCR), a recordable DVD player, etc., can also receive or transmit image/video signals with the display interface 102. Hence, image/video from the mobile device 100 can be stored at the external storage unit 122, or stored images/video from the external storage unit 122 can be displayed or wirelessly transmitted at the mobile device 100. The display interface 102 is configured to allow same or different images/video to be stored simultaneously at the mobile device 100 and the external storage unit 122, or same or different images/video to be simultaneously displayed at the external display 120 and the display 104. The external storage unit 122 may be one or more storage units.

It is also contemplated that a user may select between storing and/or viewing information at the external display 120 and/or external storage unit 122 only, even though the information origination occurs from the mobile device 100.

The display interface 102 is a multiple display interface or a multi-video interface and is adapted to convert the images and/or motion video produced by the image/video processing unit 106 into one of any of a variety of output formats, such as NTSC, PAL, or digital video.

In this manner, a system and method for viewing information from a mobile device at more than one display, even a display not attached or embedded to the mobile device, is disclosed herein. A display interface is configured to permit images/video captured, received, or otherwise present at the mobile device to be outputted to a variety of devices not native to the mobile device, in a format compatible with standard TVs, monitors, VCRs, and other entertainment devices. Thus, images/video can be more readily viewed at higher resolution and viewing size, as well as being able to store large amounts of images/video.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portion of this application. When the claims use the words "or" in reference to a list of two or more items, that word covers all of the following interpretations of the word: any of the items in the list, all of the items in the list, and any combination of the items in the list.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A mobile phone, comprising:
a native display;
a processing unit;

a local memory of the mobile phone coupled to the processing unit, the local memory configured to store image signals for display;

an interface to format and route signals between the mobile phone and an external device coupled to the mobile phone, the interface configured to:

convert the format of image signals used within the mobile phone to generate converted image signals for use by the external device; and convert the format of image signals received from the external device to generate converted image signals for use by the mobile phone;

wherein the converted image signals for use by the external device and the converted image signals for use by the mobile phone are capable of being stored and displayed simultaneously at the external device and the mobile phone.

2. The mobile phone of claim 1, wherein the external device is selected from a group including a television, a monitor, a video cassette recorder (VCR), a video tape recorder (VTR), and a recordable DVD device.

3. The mobile phone of claim 1, wherein the external device is a video recording unit and the interface converts video signals stored by the video recording unit into a format compatible for local storage and display in the mobile phone.

4. The mobile phone of claim 1, wherein the external device is a television comprising a display and a storage unit and the interface converts video signals received from the storage unit of the television into a format compatible for local storage and display in the mobile phone.

5. The mobile phone of claim 1, wherein the mobile phone includes a transceiver and a baseband processing unit coupled to the processing unit to provide wireless communication and the mobile phone is configured to permit video signals received from the external device to be transmitted from the mobile phone.

6. The mobile phone of claim 5, further comprising a camera native to the mobile phone.

7. The mobile phone of claim 1, wherein the interface is configured to convert the format of video signals output from the mobile phone into the image signal format of the external device.

8. The mobile phone of claim 1, wherein the interface is coupled to the display and to the processing unit.

9. The mobile phone of claim 1, wherein one or more of the image signals are stored for later display at the native display of the mobile phone.

10. The mobile phone of claim 1, wherein the converted image signals for use by the mobile phone and the converted image signals for use by the external device have different sizes and resolutions.

11. A mobile phone, comprising:
a native display;
a processing unit;
a local memory of the mobile phone coupled to the processing unit, the local memory configured to store image signals for display;
an interface to format and route signals between a set of components of the mobile phone and an external video device coupled to the mobile phone,
the interface being operative to convert the format of image signals output from the mobile phone to the external video device to generate converted image signals for use by the external video device and convert the format of image signals received from the external video device to generate converted image signals for use by the mobile phone,
wherein the converted image signals for use by the external device and the converted image signals for use b the mobile phone are capable of being stored and displayed simultaneously at the external device and the mobile phone.

12. The mobile phone of claim 11, wherein the external video device is a television comprising a display and a storage unit and the interface converts video signals received by the storage unit of the television into a format compatible for local storage and display in the mobile phone.

13. The mobile phone of claim 11, wherein the external video device is a video recording storage unit and the interface converts video signals stored by the video recording unit into a format compatible for local storage and display in the mobile phone.

14. The mobile phone of claim 11, wherein the mobile phone includes a transceiver and a baseband processing unit coupled to the processing unit to provide wireless communication and the mobile phone is configured to permit video signals received from the external video device to be transmitted from the mobile phone.

15. The mobile phone of claim 11, wherein one or more of the image signals arc stored for later display at the native display of the mobile phone.

16. The mobile phone of claim 11, wherein the converted image signals for use by the mobile phone and the converted image signals for use by the external device have different sizes and resolutions.

17. A mobile phone, comprising:
a native display;
a processing unit;
a transceiver and a baseband processing unit coupled to the processing unit to provide wireless communication;
a local memory of the mobile phone coupled to the processing unit, the local memory configured to store image signals for display;
an interface to format and route signals between a set of components of the mobile phone and an external video device coupled to the mobile phone, the interface configured to convert image signals used within the mobile phone to generate converted image signals for use by the external video device; and
the mobile phone configured to receive video signals from the external video device and convert the received video signals to generate converted image signals for use by the mobile phone for storage, display, or wireless transmission,
wherein the converted image signals for use by the external device and the converted image signals for use by the mobile phone are capable of being stored and displayed simultaneously at the external device and the mobile phone.

18. The mobile phone of claim 17, wherein the external video device is a television comprising a display and a storage unit and the interface converts video signals received by the storage unit of the television into a format compatible for local storage and display in the mobile phone.

19. The mobile phone of claim 17, wherein the external video device is a video recording storage unit and the interface converts video signals stored by the video recording unit into a format compatible for local storage and display in the mobile phone.

20. The mobile phone of claim 17, wherein one or more of the image signals are stored for later display at the native display of the mobile phone.

21. The mobile phone of claim 17, wherein the converted image signals for use by the mobile phone and the converted image signals for use by the external device have different sizes and resolutions.

22. A system for storing and displaying images and video in multiple devices, comprising:
- at least one external device, comprising:
  - a display configured to display images and video; and
  - a storage unit configured to store images and video; and
- a mobile phone, comprising:
  - a native display configured to display images and video;
  - a local memory configured to store images and video; and
  - an interface to format and route signals between the mobile phone and the at least one external device, the interface configured to:
    - convert image signals received by the mobile phone from the at least one external device to generate converted image signals for use by the mobile phone; and
    - convert image signals received by the at least one external device from the mobile phone to generate converted image signals for use by the at least one external device,
    - wherein the converted image signals for use by the at least one external device and the converted image signals for use by the mobile phone are capable of being stored and displayed simultaneously at the at least one external device and the mobile phone.

* * * * *